Figure 1:
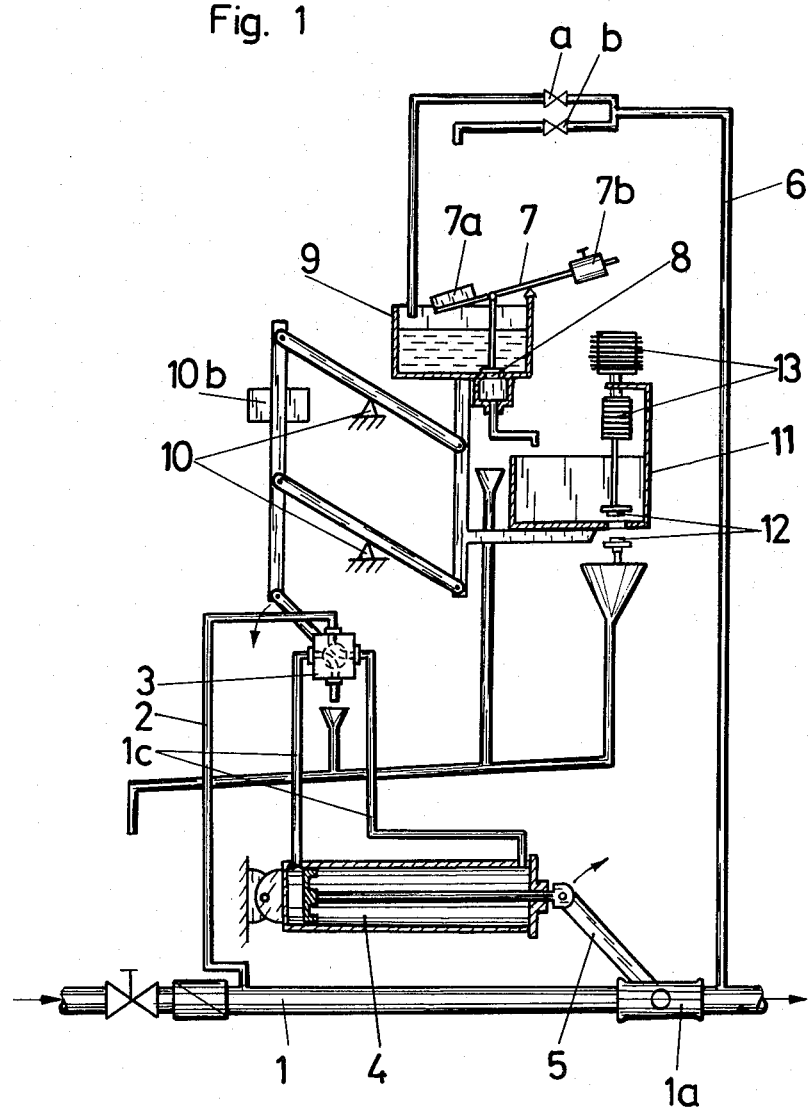

United States Patent

Sterlich

[15] 3,696,827
[45] Oct. 10, 1972

[54] DEVICE FOR AUTOMATIC PLANT WATERING

[72] Inventor: Heinrich Sterlich, Osterrich 2801, Katzelsdorf, Austria

[22] Filed: Dec. 8, 1969

[21] Appl. No.: 870,287

[52] U.S. Cl. ..........................137/79, 47/38, 137/78, 137/408, 137/624.14
[51] Int. Cl. .............................................A01g 27/00
[58] Field of Search ..........137/78, 79; 239/65; 47/38

[56] References Cited

UNITED STATES PATENTS

| | | |
|---|---|---|
| 1,822,901 | 9/1931 | Lacy-Mulhall ....... 137/624.14 |
| 2,577,337 | 12/1951 | Lancaster .................... 137/78 |
| 3,272,225 | 9/1966 | Frampton ................ 239/65 X |
| 3,273,579 | 9/1966 | Koculyn ................... 239/65 X |

Primary Examiner—M. Cary Nelson
Assistant Examiner—Richard Gerard

[57] ABSTRACT

A device for automatic plant watering has a fluid control valve. The valve is actuated by a pump which is controlled by a multi-way cock. The multi-way cock is connected to a scale carrying two vessels on a scale beam. Water is drained from the first vessel when a second scale connected to this vessel is not subjected to the pressure of water flowing into the vessel. Water from the first vessel flows to the second vessel from which it is drained by a heat-sensitive device.

4 Claims, 2 Drawing Figures

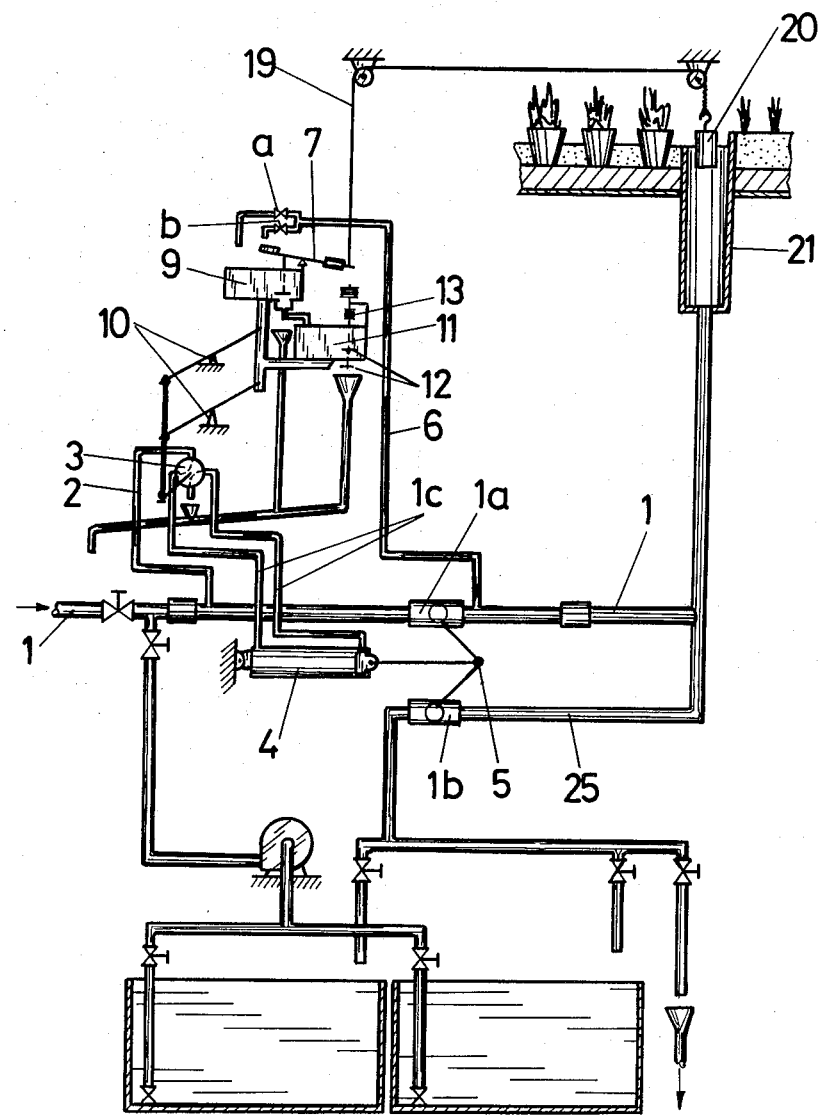

DEVICE FOR AUTOMATIC PLANT WATERING

Subject invention concerns a device for automatic plant watering, having a valve incorporated in the pressure water piping leading to the watering system for the purpose of becoming opened and closed in function of a multi-way cock controlled by weighing scales.

Devices for automatic plant watering involving the control of water supply by means of scales are already known. They use the loss of weight occurring through evaporation for controlling a valve installed in the pressure water piping.

Furthermore, other automatic plant watering systems have become known where the water supply is controlled in function of moisture degree and conditions of temperature, the former one being controlled by means of a float with temperature adjustment made through use of bimetal strips.

However, such systems known may only be applied to a definite type of watering while subject invention intends to implement all types of watering like sprinkling, bedewing, dripping etc. Further, the equipment under subject invention can also be used for operating aeration or shadowing systems as well as sprinkling facilities for glass roofs etc. Systems combining the types mentioned are also possible. Under the present invention, this is achieved by a primary and secondary weighing system including a tube spring filler sensitive to heat. More specifically, subject invention consists in that a vessel is provided for at one side of the scale beam comprising such weighing scales, supplied with liquid at intervals of watering periods, while an adjustable balance weight is fixed to the other side of said scale beam, and a second scale being positioned on said vessel, having at one side of its scale beam a bowl fixed thereto and a valve mounted to bottom of said vessel, with an adjustable weight being arranged at the other side of said scale beam.

A further feature of subject invention is the inclusion of an additional vessel, positioned at the vessel supporting side of the weighing scales, the bottom valve of which is controlled by a tube spring dependent on temperature and filled with alcohol or the like.

The subject invention, therefore, comprises an equipment which reacts to the weight of a few drops of water as well as to the rise or fall of temperature, the desired working temperature being subject to adjustment up to a precision of ±0.5° C.

The present system may be applied to all types of watering requirements, length of watering periods and necessary water quantities being automatically adjusted to weather conditions existing at any given moment. By using a pump operated through working pressure, any switching function is carried out under sufficient power reserve.

In the light of subject invention, the controlled and adjusted inflow at the primary weighing scales acts on a pilot valve permitting a water vessel on the secondary weighing scale beam to accumulate through controlled and adjustable water supply an excess weight of liquid equally subject to regulation and operating the secondary weighing scales. Such weighing function actuates a two-way cock controlling the pump of bilateral effect which will provide in turn for the different switching operations. A further feature of subject invention is the use of outflowing water controlled by the primary weighing scales and conveyed for additional temperature control to a second water vessel located under the upper one on the secondary weighing scale beam. Here, the final outflow is controlled by a valve subject to precision adjustment for increasing or decreasing temperatures. Said valve may be shifted up or down, and is connected with a tube spring filled with alcohol, gasoline (petroleum ether) or other suitable liquids sensitive to heat, and, reacting to the expansion or contraction of the liquid sensitive to heat, applying a longitudinal motion to the adjustable valve body fixed thereto as a result of which the valve will open or close whatever may be the case. Through such valve operation the secondary weighing scales is locked or released again, independent from the primary weighing scales.

Before the valve or cock, actuated by the pump of bilateral effect, the supply line, permanently conveying pressure water, to the two-way cock will be found. In the event of incorporating floating scales as a primary weighing system, said supply line shall be equipped with a branch conduit including a dripping device to assure a constant water level in said floating scales. Standard primary weighing systems do not require such branch conduits, however, floating scales proved more sensitive to precision adjusting.

Pressure water will be supplied to valve or cock only with open valve or operated cock permitting watering, this feature alone providing already for a scale actuating control. Said pressure water piping includes two inflow lines, one being used for adjustable dripping of primary scales operating the water outflow valve of the water vessel fixed to secondary scales while the other one serves for adjustable filling of the valve controlled water vessel, increasing thus the load thereof.

All control activities and many other adjustments shall be set initially as suggested by experience made or also by using metering instruments, and carried out thereafter automatically by the device described.

Further advantages are that the equipment under subject invention will react without electrical power supply to dryness, moisture and heat, and may be connected to any water pressure line adapted to the requirements of various field or hothouse plantations.

Moreover, the watering system may be cut in and out manually any time as a matter of course.

Additional advantages of the equipment are freedom of selection as to locations with respect to power supply connection, no expenses for power supply and connections. All difficulties arising from the required observation of regulations connected therewith cease to exist. The equipment is of such low costs as to defy competition by similar items requiring electromotors for operation. Therefore, not only suitable for big size plant operation but also within the financial possibilities of the more general public.

Furthermore, anyone may become an experimentalist without having to observe relevant regulations.

Owing to its low weight and universal use, the equipment may be readily assigned to various locations. In the event of water supply done by a single pump (gasoline, diesel, electrical), a pressure control is provided for. The equipment is 100 percent reliable, reacts easily (some water drops, 1° C temperature difference), and includes a sturdy structure. For connecting the equipment, any pressure water piping will do. Anybody will be able to make the tie-in easily by using the junction units supplied as per request.

Proper employment of the equipment may boost expected yields up to 40 percent.

FIG. 1 of drawing shows a design example of the device developed under subject invention.

FIG. 2 presents the equipment under subject invention during accumulation watering.

The pressure water flow to two-way cock 3 is connected to pressure water piping 1, and, therefore, kept under permanent water pressure. The two-way cock 3 is operated by means of scales 10. This actuation assures an alternate in-and outflow to and from pump 4 of bilateral effect, causing the pump rods 5 to open and close slide 1a of pressure piping 1. Pressure water supply 6 to cocks a and b will only occur with slide opened. As shown on the drawing, slide 1a is closed, therefore absence of pressure water in piping 6.

METHOD OF OPERATION WITH SHORT TERM MOISTENING ( FIG. 1.)

Actuated by scales 10, slide 1a opens and pressure piping 6 takes in water up to cocks a and b. Scales 10 are located opposite 10 b, holding two water vessels with a volume capacity of three-fourths liters each. A small pair of scales 7 is mounted to top of upper vessel 9. Above plate of small scales 7 inflow cock a is provided for. It is assumed that vessel 9 with small scales 7 is close to inflow cocks a and b. Now, when opening cocks a and b, a water jet hits the plate of small scale 7, closing under pressure valve 8 in vessel 9, being connected to said scales. Subject water inflow from cocks a and b fills vessel 9 up to half-full within about a few seconds, thus causing the weighing section of scales to drop and to switch water flow in direction of pump 4 as a result of which cock 1a becomes locked. This lock will also cut off inflow in direction of cocks a and b. The scales plate becoming thus released, small scales 7 will open valve 8 and outflowing water releases scales 10, bringing about another switching effect by means of scales 10.

This function assures a rhythmical moistening to last a few seconds.

Such rhythm is variable in time and adjustable to automatic switching through different positioning of cocks a and b, applying the respective loads to plate of small scales 7 and vessel 9.

METHOD OF OPERATION WITH FIELD SPRINKLING (FIG.1)

By fixing a framed absorbent plastic foam to plate of small scale 7, valve 8 will not open unless the balance weight lifts the drying foam together with scale plate on account of reduced weight. With valve 8 opening, accumulated water flows off, causing the scales 10 to switch again and sprinkling to start. The foamy plastic is moistened, as required, by accordingly set cock a. Picking a suitable foam thickness and framing, the proper relation may be determined with respect to cultivated plants. Thus, the foamy matter becomes the model of the soil involved.

The water volume to be applied to the cultivated plants will be set by using cock b.

The water volume applied during a determined period of time is dependent on the type of watering system used. In this connection, practical experience will be of great importance.

METHOD OF OPERATION WITH ACCUMULATED WATER (FIG.2)

When using accumulated water, small scales 7 should be positioned above accumulation tank in such a way as move a hanger 19 located at water plate and holding famed plastic foam 20 to accumulation level under dry conditions. With accumulation reaching plastic foam, absorption occurs, pulling down plate 7 b of small scales 7 for closing valve 8. This will load vessel 9 by accumulating inflow from cock b, making scales 10 to switch for emptying accumulation tank. Sinking plastic foam 22 enters outflow pipe 21 up to subsequent drying.

Inflow 1 and outflow 25 from accumulation bed are actuated simultaneously with pump rods 5. Upon opening inflow 1, outflow 25 becomes closed or conversely. Inflow pipe 1 and outflow pipe 25 are located with slides 1a and 1b side by side, thus providing for simultaneous opening and closing. This process assures a favorable aereation of soil within the roots area.

METHOD OF OPERATION WITH TEMPERATURE CONTROL (FIG.1)

Temperature controlled moistening, watering or sprinkling occurs as follows.

Water flowing from vessel 9 enters vessel 11. Here, the scales releasing flow is governed by temperature controlled adjustable valves 12. By means of such valves, operated by tube spring unit filled with gasoline (petroleum ether) 13, the outflow may be governed in dependence on temperature.

In this manner, all operations concerning moistening, watering and sprinkling may not only be set in accordance with moisture degree and volume of water but also as a function of temperature conditions.

METHOD OF OPERATION WITH LARGE AREA SPRINKLING (FIG.1)

For the purpose of large area sprinkling, adequate pipe dimensions with suitable slides are included. The entire weighing system remains of identical dimensions for all types of moistening, watering or sprinkling but pump 4 will have to be strengthened in accordance with requirements of large area sprinkling. For the purpose of satisfying given conditions, pump 4 and pressure piping 1 will be coupled separably with high-speed connections for inflow 2 to two-way cock 3 and inflow 6 to cocks a and b as well as to pump of weighing system. Owing to separable coupling it is possible on the one hand to provide for a separate assembly of the weighing system on a tractor, and on the other, of piping with pump slide 1 a.

I claim:

1. Device for automatic plant watering, having a valve incorporated in a pressure water piping leading to a watering system for controlling fluid flow to said system as a function of a multi-way cock controlled by weighing scales, means to supply a restricted fluid flow to said scales during intervals of fluid flow in said system, said scales characterized in that a vessel (9) is provided at one side of a scale beam and an adjustable balance weight (10b) is fixed to the other side of said scale beam, said vessel being positioned to receive said restricted fluid flow and thereby actuate said cock as a function of the liquid level in said vessel, a second scale being positioned on said vessel (9) having on one side of a second beam a bowl (7a) fixed thereto and a drain valve (8) actuated by movement of said second scale beam to control a drain opening in the bottom of said vessel, an adjustable weight (7b) being arranged at the opposite end of said second beam, said bowl receiving at least a portion of the restricted fluid flow to actuate said drain valve as a function of the liquid level in said bowl.

2. Device as claimed in claim 1 characterized in that an additional vessel (11) is positioned at the vessel supporting side of the first scale beam for movement therewith and disposed to receive fluid drained from said first vessel (9), said additional vessel having a drain valve controlling an opening in the bottom of same which valve is controlled by a tube spring (13) sensitive to heat.

3. Device as claimed in claim 2 characterized in that means is provided for adjustment of the travel of said tube spring.

4. Device as claimed in claim 2 characterized in that liquid is fed via multi-way cock (3) to a pump (4) for controlling the valve incorporated in the pressure water piping leading to a watering system.

* * * * *